US011982357B2

(12) United States Patent
Shaer et al.

(10) Patent No.: US 11,982,357 B2
(45) Date of Patent: May 14, 2024

(54) CYLINDER OF AN INTERNAL COMBUSTION ENGINE

(71) Applicant: MAN Energy Solutions SE, Augsburg (DE)

(72) Inventors: Talat Shaer, Augsburg (DE); Marcel Morgenstern, Chemnitz (DE); Markus Bauer, Augsburg (DE)

(73) Assignee: MAN ENERGY SOLUTIONS SE, Augsburg (DE)

(*) Notice: Subject to any disclaimer, the term of this patent is extended or adjusted under 35 U.S.C. 154(b) by 545 days.

(21) Appl. No.: 16/486,373

(22) PCT Filed: Feb. 2, 2018

(86) PCT No.: PCT/DE2018/100085
§ 371 (c)(1),
(2) Date: Aug. 15, 2019

(87) PCT Pub. No.: WO2018/149444
PCT Pub. Date: Aug. 23, 2018

(65) Prior Publication Data

US 2021/0381597 A1 Dec. 9, 2021

(30) Foreign Application Priority Data

Feb. 16, 2017 (DE) ........................ 102017103159.6

(51) Int. Cl.
*F16J 9/22* (2006.01)
*F16J 9/06* (2006.01)
*F16J 9/20* (2006.01)

(52) U.S. Cl.
CPC . *F16J 9/22* (2013.01); *F16J 9/20* (2013.01); *F16J 9/203* (2013.01); *F16J 9/206* (2013.01); *F16J 9/063* (2013.01)

(58) Field of Classification Search
CPC ...... F16J 9/20; F16J 9/203; F16J 9/206; F16J 9/22; F02F 5/00
See application file for complete search history.

(56) References Cited

U.S. PATENT DOCUMENTS 1,519,697 A * 12/1924 North ........................ F16J 9/206 277/463
1,781,207 A * 11/1930 Wysong ..................... F16J 9/22 277/456
(Continued)

FOREIGN PATENT DOCUMENTS

CN 1250505 4/2000
CN 102900559 1/2013
(Continued)

OTHER PUBLICATIONS

Office Action dated Aug. 3, 2020 issued in Japanese Patent Application No. 2019-544037.
(Continued)

*Primary Examiner* — Nicholas L Foster
(74) *Attorney, Agent, or Firm* — Cozen O'Connor

(57) ABSTRACT

A cylinder of an internal combustion engine, having a cylinder liner and a cylinder piston guided in the cylinder liner The cylinder piston has multiple ring grooves delimited by ring webs and are separated by the ring webs. Each ring grooves receives a compression ring or an oil scraping ring. Each ring groove is delimited by an upper groove flank, a lower groove flank and a groove base, and each piston ring has a lower ring flank, an upper ring flank a ring back and a section which rests against a radially inner running surface of the cylinder liner. A depression is introduced into the lower groove flank of the at least one ring groove or each ring groove which receives a compression ring and/or into the lower ring flank of the piston ring designed as a compression ring.

15 Claims, 6 Drawing Sheets

(56) References Cited

U.S. PATENT DOCUMENTS

| | | | | |
|---|---|---|---|---|
| 2,034,555 | A | 3/1936 | Berstler | |
| 2,387,855 | A * | 10/1945 | Phillips | F16J 9/20<br>277/460 |
| 2,834,643 | A * | 5/1958 | Hutto | F16J 9/203<br>277/455 |
| 4,103,594 | A * | 8/1978 | Geffroy | F16J 9/203<br>92/159 |
| 4,438,937 | A | 3/1984 | Moriarty | |
| 5,303,683 | A * | 4/1994 | Wittwer | F16J 9/00<br>277/455 |
| 5,598,763 | A | 2/1997 | Rao et al. | |
| 5,743,171 | A * | 4/1998 | Ariga | F16J 9/062<br>92/208 |
| 6,113,107 | A * | 9/2000 | Wang | F16J 9/10<br>277/460 |
| 6,837,146 | B2 * | 1/2005 | Issler | B23K 26/364<br>123/193.6 |
| 10,125,870 | B2 * | 11/2018 | Mittler | F16J 9/20 |
| 2002/0033579 | A1 * | 3/2002 | Ishida | F16J 9/203<br>277/434 |
| 2012/0061920 | A1 | 3/2012 | Nishiura et al. | |

FOREIGN PATENT DOCUMENTS

| | | | |
|---|---|---|---|
| CN | 105264109 | | 1/2016 |
| CN | 106337755 | | 1/2017 |
| DE | 642 841 | | 3/1937 |
| DE | 2503984 | | 8/1975 |
| DE | 83 22 242 | | 3/1985 |
| DE | 698 09 044 | | 6/2003 |
| DE | 69809044 | T2 | 6/2003 |
| DE | 112010002065 | | 7/2012 |
| DE | 112010002865 | | 7/2012 |
| FR | 2524936 | | 10/1983 |
| GB | 442 570 | | 2/1936 |
| GB | 2344633 | | 6/2000 |
| JP | S 47-7281 | Y | 3/1972 |
| JP | S 53-92076 | | 8/1978 |
| JP | S 56-109127 | | 8/1981 |
| JP | S 57-22648 | | 2/1982 |
| JP | S 61-190152 | | 8/1986 |
| JP | S 62-251454 | | 11/1987 |
| JP | H 05-42825 | U | 6/1993 |
| JP | 2000-170602 | | 6/2000 |
| JP | 2000-514156 | | 10/2000 |
| JP | 2005-344824 | | 12/2005 |
| JP | 2010-222985 | | 10/2010 |
| JP | 2013-24420 | | 2/2013 |
| JP | 53-41616 | B2 | 11/2013 |
| KR | 1020000076207 | | 12/2000 |
| WO | WO 98/41749 | | 9/1998 |
| WO | WO 2010/133929 | | 11/2010 |

OTHER PUBLICATIONS

Office Action dated Nov. 23, 2020 issued in Chinese Patent Application No. 201880012349.3.

Office Action dated May 28, 2021 issued in Canadian Patent Application No. 3,053,653.

Office Action dated Sep. 28, 2020 issued in Canadian Patent Application No. 3,053,653.

Office Action dated Mar. 2, 2021 issued in German Patent Application No. 102017103159.6.

Office Action dated Nov. 15, 2017 issued in German Patent Application No. 102017103159.6.

Office Action dated Jan. 14, 2021 issued in European Patent Application No. 18 710 997.0.

Office Action dated Nov. 17, 2020 issued in India Patent Application No. 201947032654.

Office Action dated Dec. 28, 2020 issued in Korean Patent Application No. 10-2019-7025807.

Office Action dated Feb. 8, 2022 issued in German Patent Application No. 102017103159.6.

* cited by examiner

CYLINDER OF AN INTERNAL COMBUSTION ENGINE

CROSS REFERENCE TO RELATED APPLICATIONS

This is a U.S. national stage of Application No. PCT/DE2018/100085 filed Feb. 2, 2018. Priority is claimed on German Application No. DE 10 2017 103 159.6 filed Feb. 16, 2017 the content of which is incorporated herein by reference.

BACKGROUND OF THE INVENTION

1. Field of the Invention

The invention relates to a cylinder of an internal combustion engine.

2. Description of the Prior Art

Internal combustion engines typically comprise multiple cylinders. Each cylinder of an internal combustion engine comprises a cylinder piston which is guided in a cylinder liner of the cylinder. During a working cycle, the cylinder piston is moveable up and down in the cylinder liner of the respective cylinder.

With a radially outer surface of the cylinder piston, the cylinder piston borders on a radially inner surface of the cylinder liner. Between these surfaces, a running gap is defined. On its radially outer surface, the cylinder piston comprises multiple ring grooves which are limited by ring lands and separated from one another. These ring grooves receive piston rings that project into the running gap formed between the radially outer surface of the cylinder piston and the radially inner surface of the cylinder liner. Each of the ring grooves receives a piston ring formed either as a compression ring or as an oil scraper ring which, with a radially outer piston ring portion, lies against the radially inner running surface of the cylinder liner.

A piston ring formed as compression ring serves for the gas-tight sealing of the running gap between the cylinder piston and the cylinder liner. A piston ring formed as oil scraper ring serves for scraping oil off the radially inner running surface of the cylinder liner in order to prevent an excessive amount of oil entering the combustion chamber of the respective cylinder via the running gap.

To ensure a proper operation of an internal combustion engine, at least the compression rings have to vacate their contact with a lower groove flank of the respective ring groove once during each working cycle, i.e. in the case of a 4-stroke engine once for each 720° revolution of the crankshaft of the engine, in order to make possible an adequate flushing with fresh gas or combusted gas and the oil it contains. This lifting of the compression rings off the lower groove flanks of the ring grooves is determined by the forces acting on the respective piston ring during operation. For adjusting a force equilibrium acting on the respective piston ring, which is responsible for the lifting of the piston ring off the lower groove flank of the respective ring groove, it is known from practice to open the respective piston ring in a circumferential position by forming a gap, wherein the size of this gap determines the force equilibrium that is present on the piston ring. There is a need to axially unload at least the compression rings of a cylinder of an internal combustion engine in order to reduce the force that is required for lifting the respective compression ring off the lower groove flank of the respective ring groove.

SUMMARY OF THE INVENTION

An object of one aspect of the present invention is a new type of cylinder of an internal combustion engine. According to one aspect of the invention, a recess is introduced into the lower groove flank at least of the or each ring groove receiving a piston ring formed as compression ring and/or into the lower ring flank at least of the or each piston ring formed as compression ring. By way of such recesses in the region of the lower groove flank of a ring groove and/or of the lower ring flank of a piston ring, the respective piston ring can be axially unloaded. Between the upper ring flank and the lower ring flank of the respective piston ring, a pressure compensation can thus be brought about, as a result of which the required force for lifting the piston ring off the lower groove flank of the respective ring groove is reduced.

According to an advantageous further development of one aspect of the invention, the respective recess circulates in the circumferential direction. This further development is particularly preferred for axially unloading the respective piston ring.

According to an advantageous further development of one aspect of the invention, the respective recess has a radial width that amounts to between 0.05 times and 0.9 times the radial depth of the respective ring groove, and/or to an axial depth which is greater than zero and smaller than an axial thickness of the respective piston ring. A distance between a radial center of the recess and the ring back of the respective piston ring is preferentially greater than zero and smaller than a radial thickness of the respective piston ring minus 0.5 mm. A distance between a radially outer end of the recess and a radially outer end of the respective ring groove is preferentially greater than zero. This dimensioning of the respective recess is particularly preferred and ensures an advantageous pressure compensation between the upper ring flank and the lower ring flank of the respective piston ring in order to thereby facilitate the piston ring lifting off the lower groove flank.

According to an advantageous further development of the invention, the respective piston ring comprises at least one passage that connects the respective recess to a chamber between the upper groove flank of the respective ring groove and the upper ring flank of the respective piston ring or to a chamber between the groove base of the respective ring groove and the ring back of the respective piston ring. With this further development of the invention, the pressure compensation between the upper ring flank and the lower ring flank can be further improved.

BRIEF DESCRIPTION OF THE DRAWINGS

Preferred further developments of the invention are obtained from the subclaims and the following description. Exemplary embodiments of the invention are explained in more detail by way of the drawing without being restricted to this. There it shows:

DETAILED DESCRIPTION OF THE PRESENTLY PREFERRED EMBODIMENTS

Figure 1:
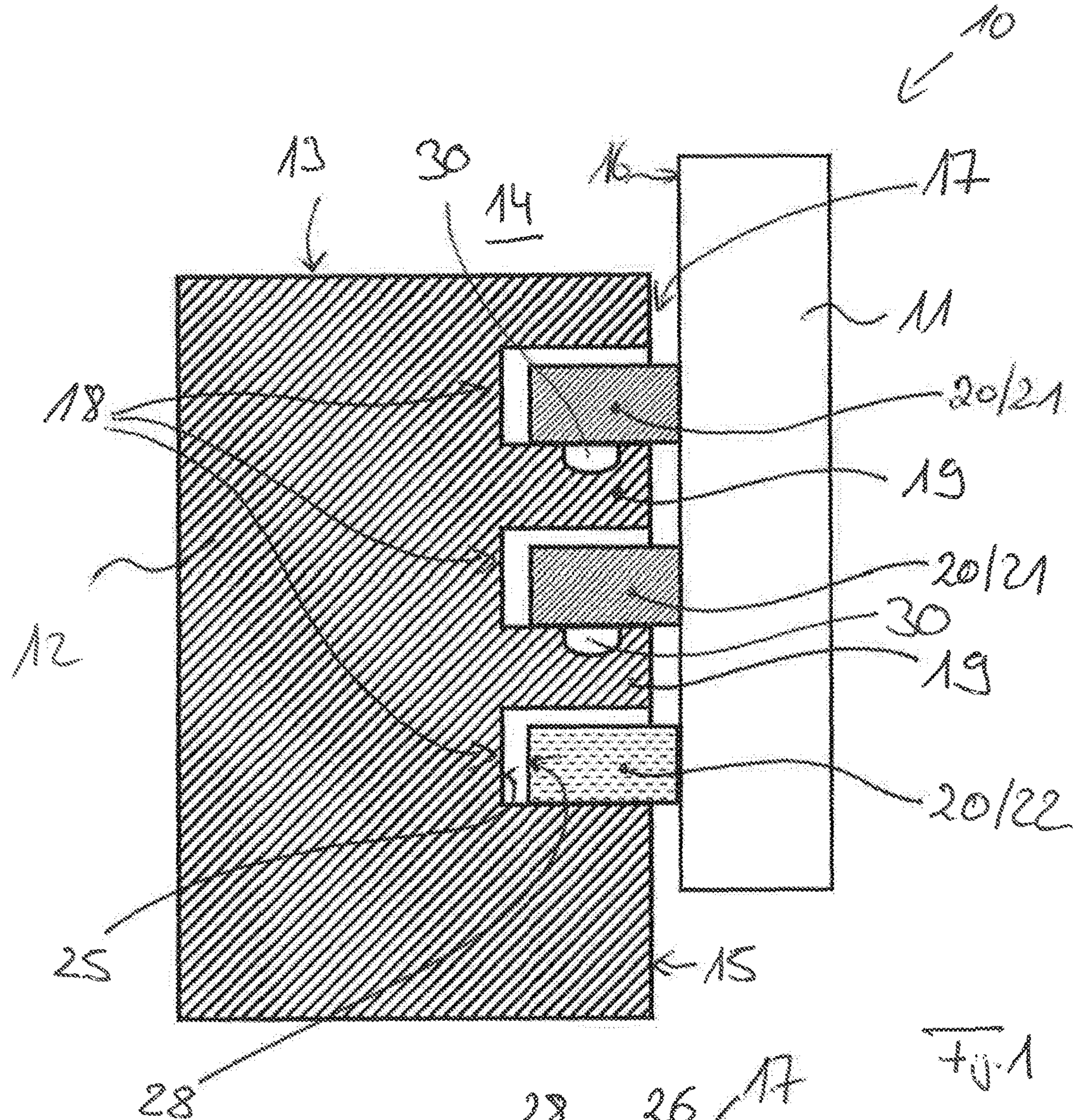
FIG. 1: is a schematised cross section through a first cylinder.

The invention relates to a cylinder of an internal combustion engine. FIG. 1 shows a schematic cross section through a cylinder 10 of an internal combustion engine, wherein in FIG. 1 of the cylinder 10 a cylinder liner 11 and a cylinder piston 12 guided in the cylinder liner are shown. During the operation of the internal combustion engine or of the cylinder 10, the cylinder piston 12 can be moved up and down in the cylinder liner 11 during a working cycle of the respective cylinder 10. A so-called piston crown 13 of the cylinder piston 12 limits a combustion chamber 14 of the respective cylinder 10 in sections.

The cylinder piston 12 has a radially outer surface 15 which with a radially inner running surface 16 of the cylinder liner 11 limits a running gap 17. This running gap 17 for the cylinder piston 12 has to be sealed gas-tight on the one hand while on the other hand it has to be avoided that oil enters the combustion chamber 14 of the cylinder via this running gap 17.

The ring grooves 18, which are spaced from one another or separated from one another by ring lands 19, are introduced into the cylinder crown 12. Each ring groove 18 receives a piston ring 20, namely either a piston ring 20 formed as compression ring 21 or a piston ring 20 formed as oil scraper ring 22. In the shown exemplary embodiments, compression rings 21 are received in two upper ring grooves 18 each and an oil scraper ring 22 each in a lower ring groove 16.

Each ring groove 18 is limited by an upper groove flank 23, a lower groove flank 24, and a groove base 25 radially inside.

Each piston ring 20 received in a ring groove 18 is limited by an upper ring flank 26, a lower ring flank 27, a ring back 28, and a portion 29 located opposite the ring back 28.

The upper ring flank 26 of the piston ring 20 is located opposite the upper groove flank 23 of the respective ring groove 18. The lower ring flank 27 of the respective piston ring 20 is located opposite the lower groove flank 24 of the respective ring groove 18. The ring back 28 of the respective piston ring 20 is located opposite the respective groove base 25 of the respective ring groove 18. With the portion 29 of the piston ring 20 located opposite the ring back 28, which projects into the running gap 20, the respective piston ring 20 thus comes to lie against the running surface 16 of the cylinder liner 11.

Figure 1A:
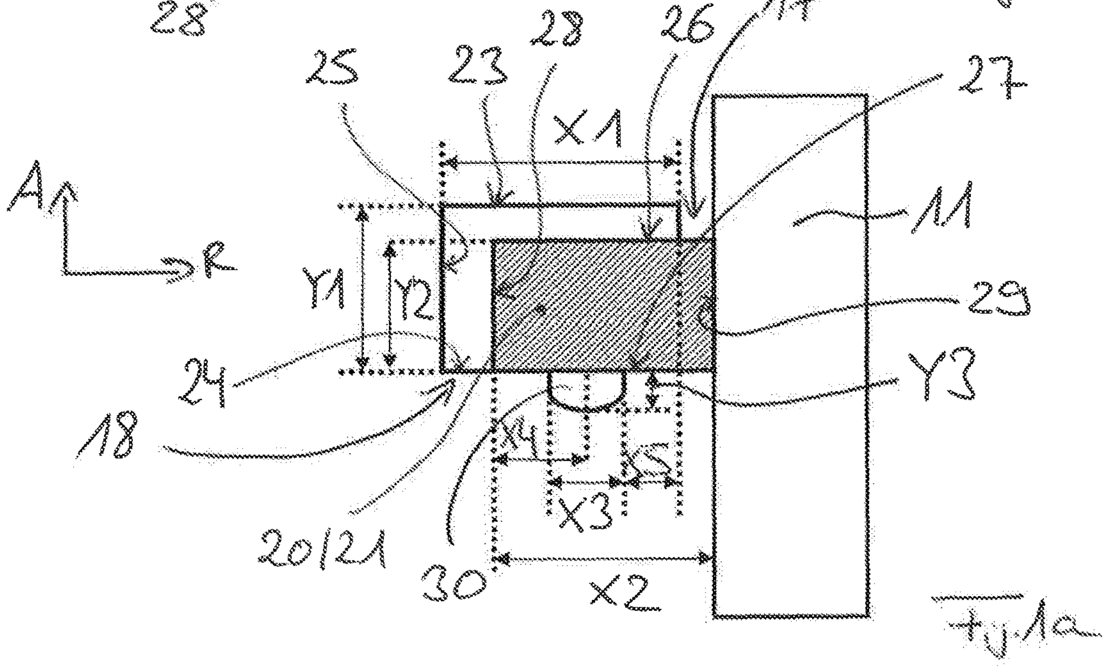
FIG. 1*a*: is a detail of FIG. 1.
Figure 2:
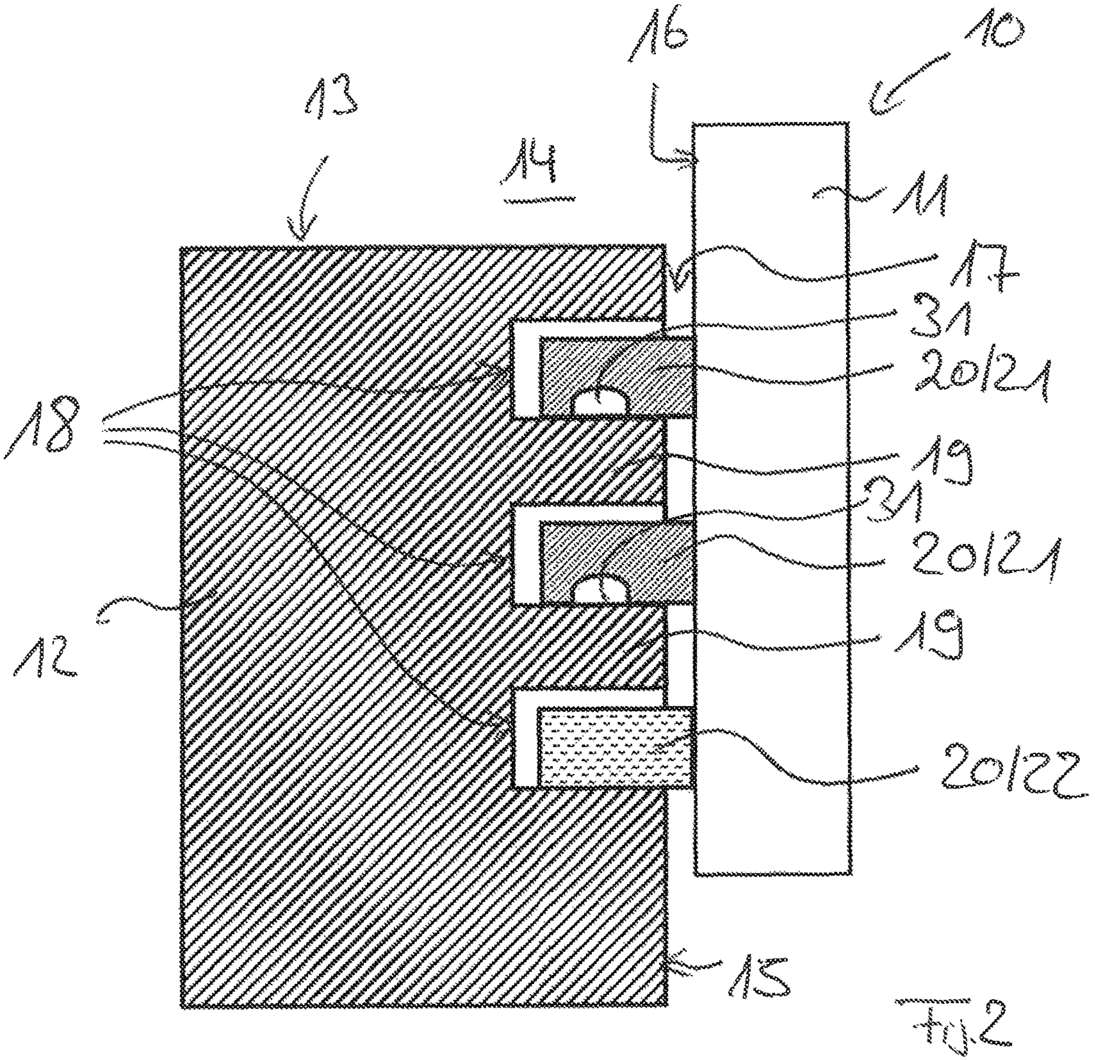
FIG. 2: is a schematised cross section through a second cylinder.
Figure 2A:
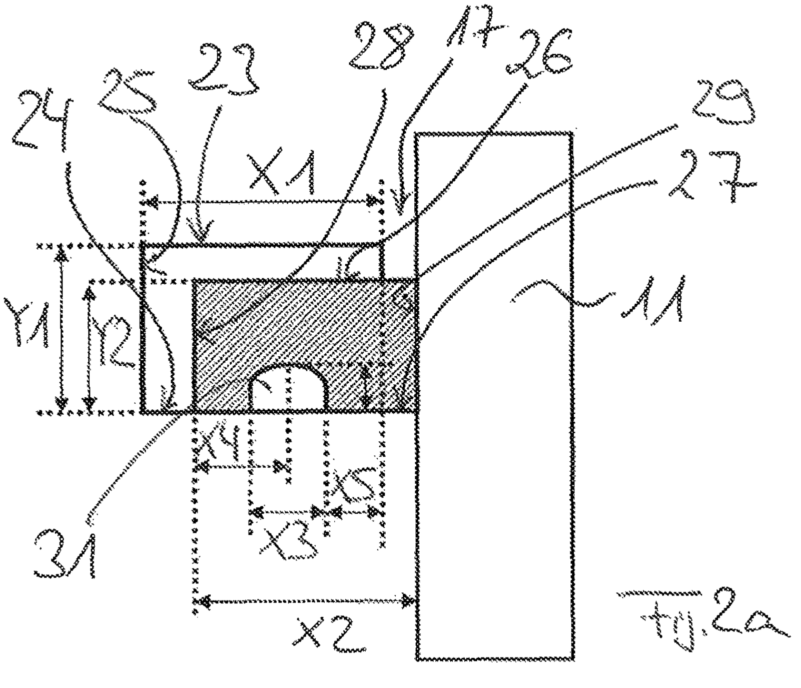
FIG. 2*a*: is a detail of FIG. 2.

As is shown in particular in FIG. 1*a*, 2*a*, each ring groove 18 comprises a radial depth X1 and an axial width Y1. Furthermore, FIG. 1*a* shows the radial direction R and the axial direction A of the piston 12, to which these dimensions refer. Each piston ring 20 has an axial height Y2 and a radial thickness X2.

Figure 3:
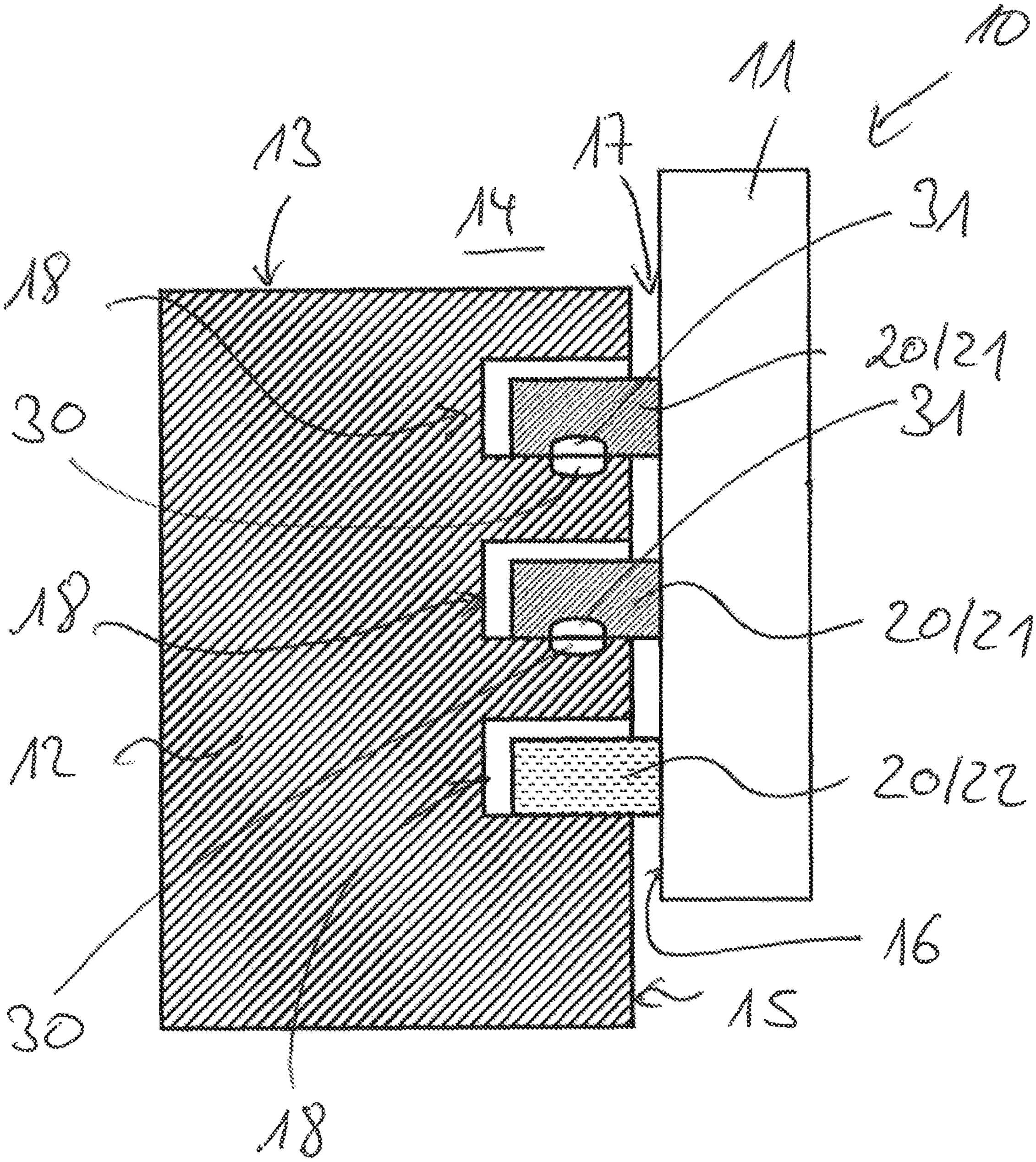
FIG. 3: is a schematised cross section through a third cylinder.
Figure 4:
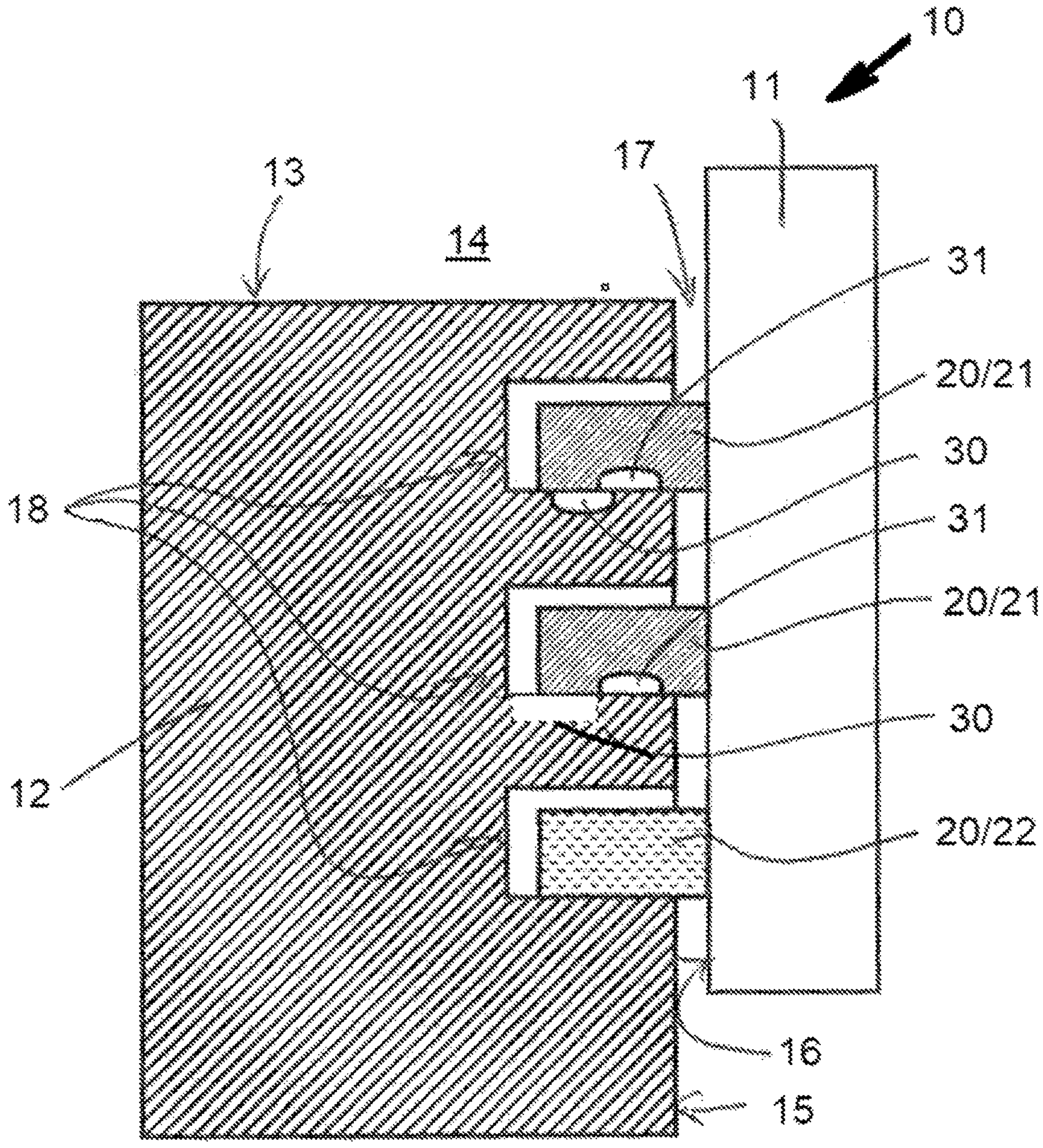
FIG. 4: is a schematised cross section through a fourth cylinder.

According to one aspect of the invention, recesses 30 and 31 respectively are introduced into the lower groove flank 24 of at least the ring groove 18 receiving the piston ring 20 formed as compression ring 21 and/or in the lower ring flank 27 at least of the piston ring 20 formed as compression ring 21. Accordingly, in the exemplary embodiment of FIG. 1, 1*a* and in the exemplary embodiment of FIGS. 5 and 6, a recess 30 is introduced exclusively into the lower groove flanks 24 at least of the ring grooves 18 receiving the compression rings 21. This recess 30 is open towards the ring groove 18. In the exemplary embodiment of FIGS. 2, 2*a*, a recess 31 is introduced exclusively into the lower ring flank 27 of the piston rings 20 formed as compression rings 21, which is likewise formed open towards the respective ring groove 18. In the exemplary embodiments of FIGS. 3 and 4, recesses 30 are introduced both into the lower groove flanks 24 of the ring grooves 18 receiving the compression rings 21 and also into the lower ring flanks 27 of the compression rings 21 located opposite. In FIGS. 3 and 4, these recesses 30, 31 overlap one another at least partly, in FIG. 3 completely and in FIG. 4 partly. It is also possible that the recesses 30, 31 seen in the radial direction do not overlap one another. FIG. 4 shows the recess 30 schematically in a non-overlapping manner. The dashed box is a schematic representation of the recess 30.

Preferentially, the recesses 30, 31 are embodied circulating in the circumferential direction. However it is also possible that the recesses 30, 31 are interrupted in defined circumferential positions.

The respective recess 30, 31 has a radial width X3 and an axial depth Y3. The axial width X3 of the respective recess 30, 31 amounts to between 0.05 times and 0.9 times the radial depth X1 of the respective ring groove 18. Preferably, the radial width X3 of the respective recess 30, 31 amounts to between 0.1 times and 0.5 times, particularly preferably between 0.25 times and 0.35 times the radial depth X1 of the respective ring groove 18.

The axial depth Y3 of the respective recess 30, 31 is greater than zero and smaller than the axial thickness Y2 of the respective piston ring 20. Preferably, this axial depth Y3 of the respective recess 30, 31 amounts to between 0.1 mm and 1.0 mm, particularly preferably between 0.3 mm and 0.7 mm. The axial depth Y3 of the respective recess 30, 31 amounts to at least 0.01 mm, preferably at least 0.05 mm.

The respective recess 30, 31, furthermore, is characterized by a distance X4 of the radial center of the same to the ring back 28 of the respective piston ring 20 and by the distance X5 between the radially outer end of the respective recess 30, 31 and the radially outer end of the respective ring groove 18.

The distance X4 between the radial center of the respective recess 30, 31 and the ring back 28 of the respective piston ring 20 is greater than zero and smaller than the radial thickness X2 of the respective piston ring minus 0.5 mm. Preferably, this distance X4 between the radial center of the respective recess 30, 31 and the ring back of the respective piston ring 20 amounts to between 0.3 times and 0.7 times, particularly preferably between 0.45 times and 0.55 times the radial thickness X2 of the respective piston ring.

The distance X5 between the radially outer end of the respective recess 30, 31 and the radially outer end of the respective ring groove is greater than zero, preferably greater than 0.05 mm, particularly preferably greater than 0.1 mm.

In all exemplary embodiments, a defined pressure compensation between an upper ring flank 26 and a lower ring flank 27 of the respective piston ring 20 can be ensured. A force, which is required during a cycle for lifting the respective piston ring 20 off the respective lower groove flank 24 of the ring groove 18 receiving the respective piston ring 20, can thus be reliably and easily reduced.

As is usual in the prior art, the piston rings 20 are slit in a circumferential position.

Figure 5:
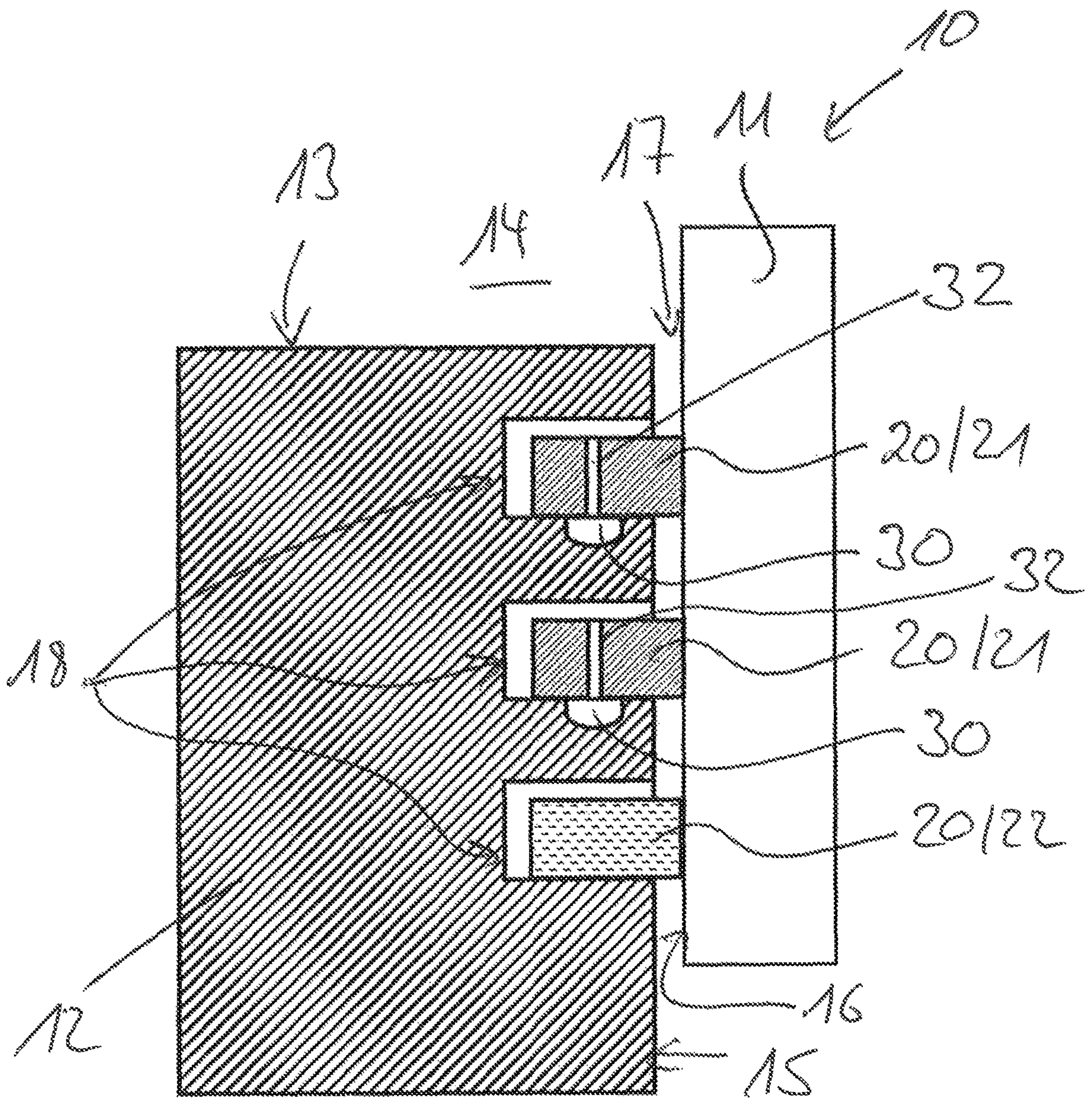
FIG. 5: is a schematised cross section through a fifth cylinder according to the invention.
Figure 6:
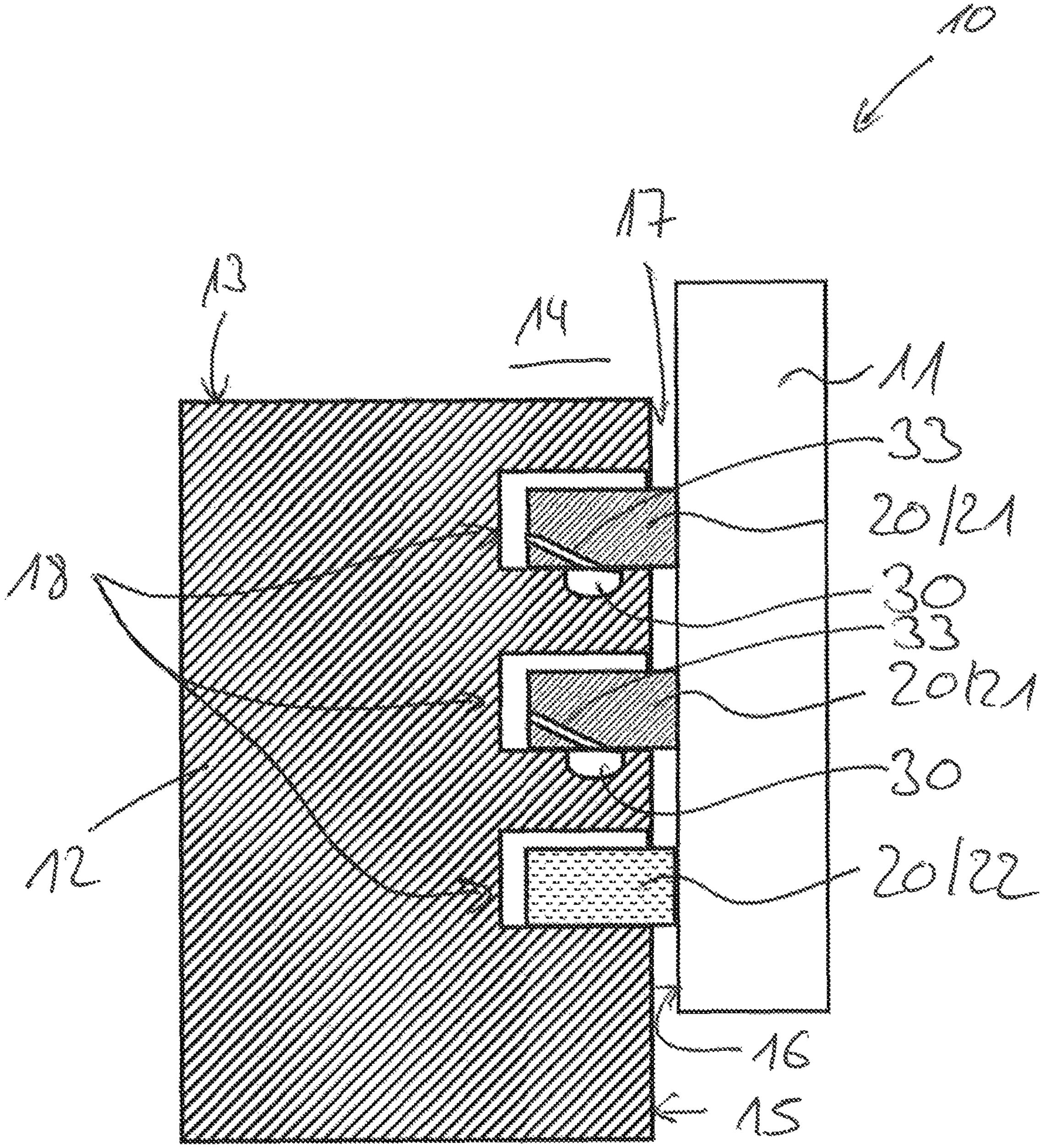
FIG. 6: a schematised cross section through a further cylinder.

Further developments of the invention are shown by FIG. 5, 6. Accordingly it is provided in FIG. 5 that a passage 32 is introduced into the piston ring 20, namely into the respective compression ring 21, via which the respective recess 30 is connected to a chamber, which is formed between the upper ring flank 26 of the respective piston ring 20 and the upper groove flank 23 of the ring groove 18 receiving the respective piston ring 20. Such a passage 32 is introduced into the piston ring 20 in at least one circumferential position, preferentially in multiple circumferential positions. FIG. 6 shows an embodiment of the invention, in which passages 33 are likewise introduced into the piston rings 20, namely into the compression rings 21, wherein the passages 33 of FIG. 6 connect the respective recess 30 to a chamber, which is formed between the ring back 28 of the respective piston ring 20 and the groove base 25 of the ring groove 18 receiving the respective piston ring 20. The pressure compensation between the upper ring flank and the lower ring flank of the respective piston ring 20 can also be easily and reliably provided through these further developments of FIGS. 5 and 6. The passages of FIG. 5, 6 can also be utilised in the exemplary embodiments of FIGS. 2 to 4, wherein in the exemplary embodiments of FIGS. 2 to 4, such passages communicate in particular with the recesses 31 in compression rings 21.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A cylinder of an internal combustion engine, comprising:

- a cylinder liner;
- a cylinder piston guided in the cylinder liner, comprising:
- at least two ring grooves, wherein each ring groove is limited by an upper groove flank, a lower groove flank, and a groove base,
- at least one ring land that limit the at least two ring grooves and separate the at least two ring grooves from one another;
- a respective piston ring formed as a compression ring or as an oil scraper ring received in each of the at least two ring grooves, wherein each piston ring comprises:
  - a lower ring flank facing the lower groove flank of a respective ring groove;
  - a single planar upper ring flank facing the upper groove flank of the respective ring groove;
  - a ring back facing the groove base of the respective ring groove that is planar and extends uninterruptedly axially between the lower ring flank facing and the upper ring flank; and
  - a portion located opposite the ring back lying against a radially inner running surface of the cylinder liner,
  - wherein the single planar upper ring flank extends uninterruptedly radially between the ring back and the portion located opposite the ring back; and
- a single recess located in at least one of:
  - the lower groove flank of at least one ring groove receiving one of the respective piston rings and radially offset from at least the ring back and radially offset from a radially outer surface of the cylinder piston; and
  - the lower ring flank of at least one of the respective piston rings and radially offset from at least the groove base, wherein an entirety of the single recess faces the lower groove flank.

2. The cylinder according to claim 1, wherein the recess is formed exclusively in the lower groove flank of the respective ring groove receiving the respective piston ring, and wherein the respective piston ring is formed as compression ring.

3. The cylinder according to claim 1, wherein the recess is formed exclusively in the lower ring flank of the respective piston ring, and wherein the respective piston ring is formed as compression ring.

4. The cylinder according to claim 1, wherein the respective recess extends in a circumferential direction.

5. The cylinder according to claim 1, wherein the recess has a radial width between 0.05 times and 0.9 times a radial depth of the respective ring groove.

6. The cylinder according to claim 5, wherein the radial width of the recess is between at least one of:

- 0.1 times and 0.5 times the radial depth of the ring groove, and
- 0.25 times and 0.35 times the radial depth of the ring groove.

7. The cylinder according to claim 1, wherein the recess has an axial depth that is greater than zero and smaller than an axial thickness of a respective piston ring.

8. The cylinder according to claim 7, wherein the axial depth of the recess amounts to between at least one of:

- 0.1 mm and 1.0 mm, and
- 0.3 mm and 0.7 mm.

9. The cylinder according to claim 1, wherein a distance between a radial center of the recess and the ring back of the one of the respective piston rings is greater than zero and smaller than a radial thickness of the respective piston ring minus 0.5 mm.

10. The cylinder according to claim 9, wherein the distance between the radial center of the recess and the ring back of the respective piston ring is between at least one of:

- 0.3 times and 0.7 times the radial thickness of the respective piston ring, and
- 0.45 times and 0.55 times the radial thickness of the respective piston ring.

11. The cylinder according to claim 1, wherein a distance between a radially outer end of the recess and a radially outer end of a respective one of the ring grooves is greater than zero.

12. The cylinder according to claim 1, wherein the recess is formed in the lower groove flank of the respective ring groove and the respective piston ring comprises at least one passage, which connects the respective recess to a chamber between the upper groove flank of the respective ring groove and the upper ring flank of the respective piston ring or to a chamber between the groove base of the respective ring groove and the ring back of the respective piston ring.

13. A cylinder of an internal combustion engine, comprising:

- a cylinder liner;

a cylinder piston guided in the cylinder liner, comprising:

at least two ring grooves, wherein each ring groove is limited by an upper groove flank, a lower groove flank, and a groove base, at least one ring land that limit the at least two ring grooves and separate the at least two ring grooves from one another;

a respective piston ring formed as a compression ring or as an oil scraper ring received in each of the at least two ring grooves, wherein each piston ring comprises:

a lower ring flank facing the lower groove flank of a respective ring groove;

a single planar upper ring flank facing the upper groove flank of the respective ring groove;

a ring back facing the groove base of the respective ring groove that is planar and extends uninterruptedly axially between the lower ring flank facing and the upper ring flank; and a portion located opposite the ring back lying against a radially inner running surface of the cylinder liner, wherein the single planar upper ring flank extends uninterruptedly radially between the ring back and the portion located opposite the ring back; and a single recess located in at least one of:

the lower groove flank of at least one ring groove receiving one of the respective piston rings and radially offset from at least the ring back and radially offset from a radially outer surface of the cylinder piston; and the lower ring flank of at least one of the respective piston rings and radially offset from at least the groove base, wherein at least one additional recess is located in the other of:

the lower groove flank of the at least one ring groove receiving the piston ring; and the lower ring flank of the at least one piston ring.

14. The cylinder according to claim 13, wherein the recesses formed in the lower groove flank of the respective ring groove and in the lower ring flank of the respective piston ring overlap one another in a radial direction.

15. A cylinder of an internal combustion engine, comprising:

a cylinder liner;

a cylinder piston guided in the cylinder liner, comprising:

at least two ring grooves, wherein each ring groove is limited by an upper groove flank, a lower groove flank, and a groove base, at least one ring land that limit the at least two ring grooves and separate the multiple ring grooves from one another;

a respective piston ring formed as a compression ring or as an oil scraper ring received in each of the at least two ring grooves, wherein each piston ring comprises:

a lower ring flank facing the lower groove flank of a respective ring groove;

a single planar upper ring flank facing the upper groove flank of the respective ring groove;

a ring back facing the groove base of the respective ring groove that is planar and extends uninterruptedly axially between the lower ring flank facing and the upper ring flank; and a portion located opposite the ring back lying against a radially inner running surface of the cylinder liner, wherein the single planar upper ring flank extends uninterruptedly radially between the ring back and the portion located opposite the ring back; and a single recess located in at least one of:

the lower groove flank of at least one ring groove receiving one of the respective piston rings and radially offset from a radially outer surface of the cylinder piston; and the lower ring flank of at least one of the respective piston rings, wherein at least one additional recess is located in the other of:

the lower groove flank of the at least one ring groove receiving the piston ring; and the lower ring flank of the at least one piston ring, wherein the recess formed in the lower groove flank of the respective ring groove and the recess formed in the lower ring flank of the respective piston ring do not overlap one another in a radial direction.

* * * * *